United States Patent [19]

Tominaga et al.

[11] 4,305,851

[45] Dec. 15, 1981

[54] PROCESS FOR PREPARING A SOLID GOLF BALL

[75] Inventors: Ichiro Tominaga, Kobe; Mikio Yamada, Nishinomiya, both of Japan

[73] Assignee: Sumitomo Rubber Industries, Ltd., Hyogo, Japan

[21] Appl. No.: 157,529

[22] Filed: Jun. 9, 1980

[30] Foreign Application Priority Data

Jun. 13, 1979 [JP] Japan .................................. 54-74903

[51] Int. Cl.$^3$ ..................... C08L 7/00; C08L 33/02; C08L 9/00
[52] U.S. Cl. .................................. 260/5; 260/998.14; 273/218; 525/195; 525/196; 525/221; 525/232; 428/407
[58] Field of Search ............... 260/5, 998.14; 273/218; 525/195, 196, 221; 428/407

[56] References Cited

U.S. PATENT DOCUMENTS

| 3,454,676 | 7/1969 | Busse | 525/221 |
| 4,082,288 | 4/1978 | Martin et al. | 260/998.14 X |
| 4,165,877 | 8/1979 | Miller et al. | 260/998.14 X |

Primary Examiner—Carman J. Seccuro
Attorney, Agent, or Firm—Birch, Stewart, Kolasch & Birch

[57] ABSTRACT

A solid golf ball is prepared using a rubber composition comprising a microencapsulated zinc salt of allyl group containing carboxylic acid, which is uniformly blended into a rubber to bring an excellent impact resilience in the golf ball. Further, the rubber composition comprising the microencapsulated zinc salt has little tendency to stick to a roll at the kneading of the rubber composition.

8 Claims, No Drawings

PROCESS FOR PREPARING A SOLID GOLF BALL

DETAILED DESCRIPTION OF INVENTION

The present invention relates to a solid golf ball and its production.

The solid golf ball has become popular recently, because it is produced simply and economically by one-piece molding. However, the solid golf ball is inferior to a thread wrapped golf ball in impact resilience, spin property and feeling at hitting.

In order to improve the impact resilience, a zinc salt of an allyl group containing carboxylic acid, particularly zinc methacrylate, as a crosslinking agent has been incorporated into a rubber mixture containing a rubber and additives thereto. However, the salt of the allyl group containing carboxylic acid has a tendency to coagulate and to make agglomerates at kneading with the rubber mixture. Further, the rubber composition containing said salt is liable to stick to a kneading roll and the elimination of the stuck rubber on the kneading roll is very difficult. The agglomerates deteriorate vulcanized rubber properties and the stickiness lowers kneading workability.

In order to improve the above problem, it previously was proposed that zinc oxide be kneaded with a rubber mixture and then methacrylic acid be incorporated into the rubber mixture. However, it is difficult to obtain a rubber composition having desirable properties for the solid golf ball in this manner, because the reaction between the zinc oxide and the methacrylic acid will not be attained completely or uniformly in the rubber and control of the reaction is very difficult. Further, the resultant salt is a half salt (mono methacrylate).

It has been found that when the zinc salt of an allyl group containing carboxylic acid such as zinc methacrylate is microencapsulated with a suitable wall material and the resultant microcapsule is incorporated into the rubber mixture, the above problems such as agglomeration, stickiness and ununiformity of the reaction are dissolved.

The present invention relates to a process for preparing of a solid golf ball which comprises incorporating a microencapsulated zinc salt of an allyl group containing carboxylic acid as a cross linking agent into a rubber with suitable additives to give a rubber composition and molding the rubber composition.

In the present invention, the zinc salt of an allyl group containing carboxylic acid monomer is a dicarboxylate typically, for example, zinc dimethacrylate, zinc diacrylate, and the like. Zinc dimethacrylate is most preferable. A zinc salt of other allyl group containing carboxylic acids such as the zinc salt of crotonic acid and cinnamic acid may be used together with the zinc dimethacrylate and/or the zinc diacrylate.

The zinc salt of an allyl group containing carboxylic acid may be prepared by reacting the corresponding carboxylic acid with a zinc compound such as zinc oxide, zinc carbonate, basic zinc carbonate and the like.

Suitable wall material of the microcapsule is one having abilities to prevent the self-coagulation of the zinc dimethacrylate and the like and the sticking of the mixed rubber to the roll as caused at kneading, and to improve the dispersability of said salt without any undesirable effect to the vulcanized rubber properties, particularly elasticity and strength.

The preferred compound as wall material is a salt of a carboxyl group containing polymeric compound. A preferable salt-forming material is potassium, ammonium, calcium, aluminum, or zinc. A preferable carboxyl group containing polymeric compound is one having acrylic or methacrylic moiety or carboxymethylcellulose.

Particularly preferable compounds as wall material are substantially water-insoluble polymeric materials as obtained by substituting at least one part of a salt of a water soluble carboxyl group containing polymeric material with a polyvalent metal such as calcium, aluminum, zinc and the like. Examples of the preferable compound for wall material are zinc polyacrylate, aluminum polyacrylate, calcium polyacrylate, aluminum polymethacrylate, calcium polymethacrylate, calcium alginate, partial or whole zinc or calcium salt of carboxy-methylcellulose and partial or whole zinc or calcium salt of copolymer of vinyl monomer with acrylic acid or maleic acid anhydride. Most preferable compounds are zinc polyacrylate or aluminum polyacrylate.

The microcapsule of the zinc salt of the allyl group containing carboxylic acid monomer may be prepared by direct encapsulation of said zinc salt of acid monomer. A typical microencapsulation in the present invention is as follows: a suitable water-insoluble zinc compound such as zinc oxide, zinc carbonate or basic zinc carbonate is dispersed in water and an aqueous solution of a carboxyl group containing water soluble polymeric compound such as sodium polyacrylate is added to the dispersion with stirring. To this mixture, an aqueous solution of the polyvalent metal compound such as zinc acetate, calcium chloride and the like is added to give a microcapsule of water insoluble zinc compound which is coated with the partial or whole polyvalent metal salt of the polymeric compound as a wall material. A definite amount of the allyl group containing carboxylic acid monomer such as methacrylic acid is added to the dispersion of said microcapsule of the water insoluble zinc compound to cause said monomer to react with the encapsulated zinc compound through the wall of the microcapsule to give the microcapsule containing the zinc salt of an allyl group containing carboxylic acid as a nucleus. The microcapsule is washed, filtered, dried and then smashed to a powder having a desirable particle size. While the most preferable dispersing medium for the microencapsulation is water, other organic solvents such as trichloroethylene, may be used.

Of course, the microcapsule of the zinc salt of the allyl group containing carboxylic acid monomer may be prepared by immersing directly said acid monomer into the basic zinc compound microencapsulated with the water soluble polymeric compound such as the sodium polyacrylate.

In order to improve dispersability of the zinc compound in water, a suitable dispersing agent such as a nonionic surface active agent and an anionic surface active agent may be used. Preferable dispersing agents are the sodium salt of the condensate of $\beta$-naphthalene sulfonic acid, formaldehyde condensed polyethylene glycol alkylphenol ether and the like.

The reaction of the microencapsulated zinc compound and the allyl group containing carboxylic acid monomer may be effected by spraying the latter into the former's sprinkling dust.

A preferable ratio of the microencapsulated zinc salt of an allyl group containing carboxylic acid monomer to base rubber is from 3 to 50 parts by weight of the former in terms of zinc salt to 100 parts by weight of the latter.

In case of less than 3 parts by weight of the former, a vulcanized rubber deficient in hardness is liable to be obtained, and in case of more than 50 parts by weight of the former, a vulcanized rubber is, in general liable to become too hard.

As the base rubber, natural rubber and/or synthetic rubber may be employed. Preferably, polybutadiene or natural rubber may be used but not critical.

The rubber composition of the present invention may comprise other conventional additives such as filler (e.g. ZnO, BaSO$_4$, SiO$_2$, CaCO$_3$ etc.), peroxy compound (e.g. dicumyl peroxide, t-butylperoxybenzoate etc.) and the like.

The rubber composition is mainly used as a composition for a solid golf ball, while it may be used for a ball of other ball games.

Illustrating the invention are the following examples, which, however, are not to be construed as limiting the invention to their details. All parts and percentages in the examples are by weight unless otherwise specified.

EXAMPLE 1

Active zinc oxide (500 parts) is added to 0.2 percent aqueous solution of wetting agent (polyethylene glycol alkylphenol) (1002 parts) and kneaded for one hour. To the mixture, one percent aqueous solution of sodium polyacrylate (1000 parts) is added with sufficient stirring, and then 5% aqueous solution of zinc acetate (500 parts) is added, followed by kneading the mixture for two hours. The kneaded mixture is put into the other vessel and polyethylene glycol alkylphenol (5 parts) containing methacrylic acid (1005 parts) is charged into the kneaded mixture and then mixed for one hour.

After washing, filtering and drying, the resultants are ground and sieved to give powders having three various particle sizes of 100, 170 and 250 mesh.

Zinc dimethacrylate is identified by the peak existing near $2\theta$ being 10 to 11 degree on X-rays diffract-Ometer.

EXAMPLE 2

After the washing of the kneaded mixture obtained at the middle stage of the Example 1, the mixture is filtered, dried and ground to give a powder having a particle size of 250 mesh. The powder (500 parts) is dispersed into trichloroethylene (1000 parts) and a solution mixture of trichloroethylene (100 parts), methacrylic acid (1000 parts) and polyethylene glycol alkylphenol (7 parts) and mixed for one hour.

After washing, filtering and drying, the resultants are ground to 250 mesh particle size.

Zinc dimethacrylate in the microcapsule is identified by the same manner as described in the Example 1.

EXAMPLE 3

Mixture of the microencapsulated zinc dimethacrylate having a particle size of 170 or 250 mesh as obtained in Example 1 (42 parts), zinc oxide (SM 1) (5 parts) and BaSO$_4$ (25 parts) is kneaded into 100 parts of polybutadiene (commercially available from JAPAN SYNTHETIC RUBBER CO. LTD. as BR-01) by rolls of 6 inches diameter. Though the microcapsule is temporarily adhered to a back roll at kneading, it is dissolved into the base rubber gradually. After very little kneading, the zinc dimethacrylate is observed adhered to the rolls and no aggregates are observed in rubber composition with naked eye.

EXAMPLE 4

A mixture of the microencapsulated zinc dimethacrylate having a particle size of 100 mesh as obtained in Example 1 (42 parts), zinc oxide (5 parts) and BaSO$_4$ (25 parts) is kneaded into polybutadiene (100 parts: BR-01) in a 3 liter kneader to give a rubber composition. After the kneading, neither zinc dimethacrylate microcapsule sticking to the kneader nor the aggregates in the rubber composition are observed with naked eyes.

Dicumyl peroxide (15 parts) is added to the rubber composition and cured at a temperature of 150° C. for 30 minutes to give a vulcanized rubber (2 mm$\times$20 mm$\times$10 mm), the appearance of which is not changed.

EXAMPLE 5

Slurry prepared by mixing a zinc oxide (1000 parts), water (2000 parts), polyethylene glycol alkylphenol (10 parts) and sodium polyacrylate (30 parts) is dried by heating to give a zinc oxide coated with sodium polyacrylate. Said coated zinc oxide (330 parts) is mixed with methacrylic acid (450 parts) and ground to give a microcapsule of the zinc dimethacrylate microencapsulated with sodium polyacrylate.

The microcapsule of the zinc dimethacrylate is kneaded into a polybutadiene rubber (BR-01) with the other additives as shown in the Example 3.

Substantial amounts of the encapsulated zinc dimethacrylate sticking to the roll and of the aggregates in rubber are not observed.

Comparative Example 1

Polyethylene glycol alkylphenol (30 parts) is dissolved into methacrylic acid (1000 parts) and active zinc oxide (500 parts) is added to the solution with stirring. The temperature of the mixture is exothermic to give a solid reaction material. The reaction material is ground to powder of 170 mesh. After washed and dried, the powder is ground to 250 mesh. Existence of the zinc dimethacrylate is identified in the same manner as described in the Example 1.

The obtained zinc dimethacrylate powder and the other additives are kneaded into the polybutadiene (BR-01) using 6 inch rolls in the same manner as described in the Example 3 to give a rubber composition.

Large amounts of the powder are adhered to the rolls at the kneading, the content of the zinc dimethacrylate in the rubber composition decreases and removal of the adhered zinc dimethacrylate is very difficult. Further, in the rubber composition, many aggregates of 0.2 to 0.3 mm diameter are observed.

Comparative Example 2

Three kinds of an aqueous solution are prepared by dissolving 20 parts, 60 parts and 80 parts of polyethylene glycol alkylphenol into distilled water (1000 parts) respectively and methacrylic acid (100 parts) is added to the each solution. Active zinc oxide (500 parts) is slowly added to the each above mixture with stirring. After washing, filtering and drying, the products are ground to 250 mesh powder separately. The each zinc dimethacrylate is identified in the same manner as described in Example 1.

The above zinc dimethacrylates are kneaded into polybutadiene rubber (BR-01) with other additives in the same manner as described in the Example 3 to give rubber compositions respectively. In each case, a large amount of the zinc dimethacrylate sticks to the rolls, and aggregates are observed in the rubber composition to such a degree that the rubber composition cannot be applied to practical use. Among the three rubber compositions, a better result is obtained as the amount of the wetting agent to be added increases.

Vulcanized rubbers obtained from the above three rubber compositions using the dicumyl peroxide as in the Example 3 have many aggregates of the zinc dimethacrylate over the surface of said rubbers. The surface is coarse.

Reference Example

Rubber compositions as shown in Table 1 are kneaded with 6 inches roll to give three sheets I, II and III having 3 mm thickness.

TABLE 1

| Ingredients | part sheet I | sheet II | sheet III |
|---|---|---|---|
| polybutadiene rubber (BR-01) | 100 | 100 | 100 |
| zinc dimethacrylate prepared in Example 1 | 42 | — | — |
| zinc dimethacrylate prepared in Comparative Example 1 | — | 42 | — |
| zinc dimethacrylate prepared in Comparative Example 2 | — | — | 50 |
| zinc oxide | 5 | 5 | 5 |
| BaSO$_4$ | 25 | 25 | 25 |
| Dicup | 1.5 | 1.5 | 1.5 |

The sheets are rolled up to make cylindrical plugs having a diameter of about 3 cm × 5 cm and the plugs are pressed and vulcanized at 150° C. for 30 minutes to make golf balls I, II and III. Properties of these balls are shown in Table 2.

TABLE 2

| Properties | ball I | ball II | ball III |
|---|---|---|---|
| weight (g) | 45.2 | 44.8 | 45.2 |
| hardness | suitable | too soft | suitable |
| durability[1] | excellent | poor | good |
| initial ball speed[2] | 60.5 | 56.1 | 56.3 |

Note:
[1] The durability is estimated by counting hit numbers until the ball is broken when the ball is hit at a head speed of 44m/s repeatedly.
[2] The initial ball speed is determined by hitting a ball at a head speed of 42.1 m/s using a golf ball hitting test machine (produced by True Temper Company).

As apparent from the results, Ball I as obtained from the microencapsulated zinc dimethacrylate has a high durability and high initial speed, but Balls II and III as obtained from the powder of zinc dimethacrylate prepared by conventional methods are inferior to Ball I in both durability and the initial ball speed.

It is supposed that the reason of said inferiority is that Balls II and III have many dispersed aggregates of zinc dimethacrylate, which cause a stress concentration.

What is claimed is:

1. A process for preparing a solid golf ball which comprises incorporating a zinc salt of an allyl group containing carboxylic acid microencapsulated with water-insoluble carboxyl group containing polymeric material as a cross linking agent into a synthetic diene rubber and/or natural rubber with suitable additives to give a rubber composition and molding the said composition.

2. The process according to claim 1, wherein the zinc salt of allyl group containing carboxylic acid is a zinc dimethacrylate.

3. The process according to claim 1, wherein the microencapsulated zinc salt of allyl group containing carboxylic acid is incorporated into the rubber in a ratio of from 3 to 50 parts by weight of the former to 100 parts by weight of the latter.

4. The process according to claim 1, wherein the microencapsulated zinc salt of allyl group containing carboxylic acid is produced by microencapsulating a basic zinc compound with a carboxyl group containing polymeric compound and then impregnating an allyl group containing carboxylic acid into the microencapsulated basic zinc compound to cause a reaction.

5. The process according to claim 4, wherein the basic zinc compound is one selected from the group consisting of zinc oxide, zinc carbonate and basic zinc carbonate.

6. The process according to claim 4, wherein the microencapsulating of the basic zinc compound is effected by dispersing the basic zinc compound in an aqueous solution of an aqueous salt of a carboxyl group containing polymeric compound and replacing the aqueous salt with a polyvalent metal to make an insoluble deposition film of a polyvalent metal salt of the carboxyl group containing polymeric compound onto the basic zinc compound.

7. The process according to claim 6, wherein the aqueous salt of the carboxyl group containing polymeric compound is an alkaline metal or ammonium salt of a polymer selected from a group consisting of polyacrylic acid, vinylic copolymer having acrylic or maleic acid moiety, carboxymethyl cellulose and alginic acid, and the polyvalent metal is one selected from a group consisting of calcium, magnesium, zinc and aluminum.

8. A solid golf ball produced according to any of the preceeding Claims.

* * * * *